United States Patent [19]

Pfalzer et al.

[11] Patent Number: 4,816,117
[45] Date of Patent: Mar. 28, 1989

[54] METHOD FOR THE PREPARATION OF WASTE PAPER

[75] Inventors: Lothar Pfalzer, Heidenheim, Fed. Rep. of Germany; Gerhard Ortner, Jakarta-Pusat, Indonesia

[73] Assignee: J. M. Voith GmbH, Heidenheim, Fed. Rep. of Germany

[21] Appl. No.: 183,325

[22] Filed: Apr. 7, 1988

Related U.S. Application Data

[63] Continuation of Ser. No. 872,117, Jun. 9, 1986, abandoned.

[30] Foreign Application Priority Data

Jun. 22, 1985 [DE] Fed. Rep. of Germany ....... 3522395

[51] Int. Cl.$^4$ ............................................. D21C 5/02
[52] U.S. Cl. .......................................... 162/4; 162/5; 162/55; 241/21
[58] Field of Search ................... 162/4, 5, 55; 241/21, 241/24, 28; 209/13, 17

[56] References Cited

U.S. PATENT DOCUMENTS

| | | | |
|---|---|---|---|
| 3,994,770 | 11/1976 | Lavsch | 162/5 |
| 4,317,701 | 3/1982 | Pfalzer | 162/261 |
| 4,360,402 | 11/1982 | Ortner et al. | 162/5 |
| 4,622,099 | 11/1986 | Eelman | 162/4 |
| 4,634,059 | 1/1987 | Bahr et al. | 241/46 B |
| 4,641,790 | 2/1987 | Musselman et al. | 162/261 |

FOREIGN PATENT DOCUMENTS

| | | | |
|---|---|---|---|
| 3311082 | 9/1984 | Fed. Rep. of Germany | 162/4 |
| 52-703 | 5/1978 | Japan | 162/5 |

Primary Examiner—David L. Lacey
Assistant Examiner—K. M. Hastings
Attorney, Agent, or Firm—Albert L. Jeffers; Richard L. Robinson

[57] ABSTRACT

A method and apparatus for decomposing waste paper in a storage tank (tower) under the effect of chemicals with a high stock concentration (high-consistency stock method), including the rotation of the paper pulp together with dilution and a vigorous extensive disintegration of the waste paper or rags by a slushing rotor in the lowest part of the storage tank (tower).

4 Claims, 1 Drawing Sheet

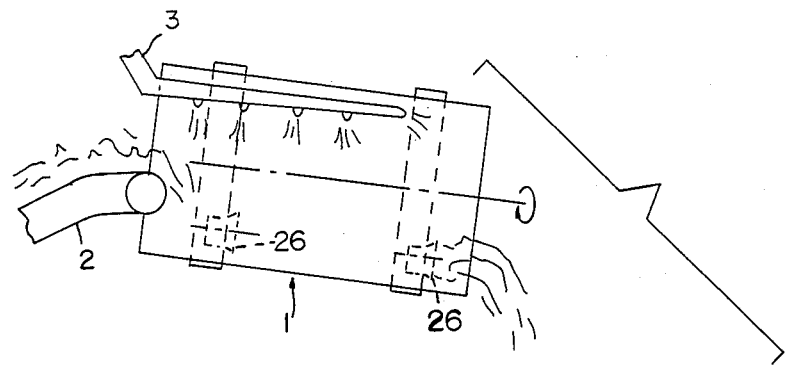
FIG.1
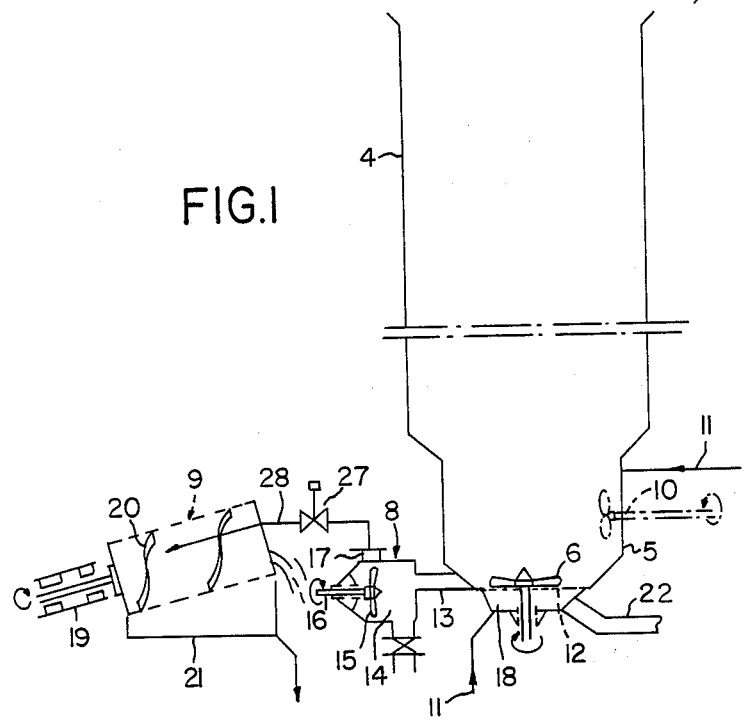
FIG.2
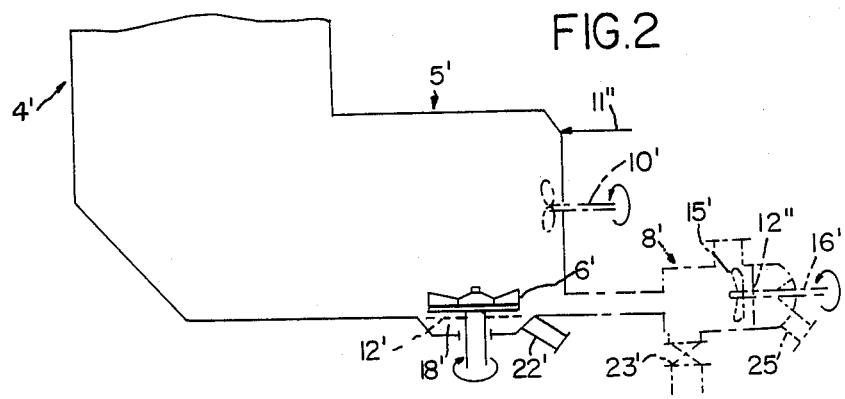

METHOD FOR THE PREPARATION OF WASTE PAPER

This is a continuation application Ser. No. 872,117, filed June 9, 1986, now abandoned.

BACKGROUND OF THE INVENTION

The present invention relates to a method and apparatus for the preparation of waste paper by means of impregnation and subsequent decomposition of the waste paper in a storage tank under the effect of chemicals with a high stock concentration, i.e., a high consistency stock method.

A prior art apparatus for effecting such a method is known from U.S. Pat. No. 4,317,701. However, with this prior art apparatus, there is a difficulty in discharging the stock from the high-consistency stock tower and, furthermore, in also simultaneously removing the large dirt content. This prior art method is particularly suitable for waste paper which is printed or dyed with dye which becomes smudged very easily and adheres to the fibers, and which also requires only a very gentle preparation of the waste paper.

SUMMARY OF THE INVENTION

The present invention overcomes the above-discussed disadvantages associated with the prior art methods and apparatuses for preparation of waste paper.

In accordance with the present invention, there is provided an improved method and apparatus, of the type discussed above, which is particularly suitable for the preparation of waste paper, printed or dyed with smudgy dyes. Through the present invention, it is possible to remove the coarse particles of dirt relatively easily and extensively, and also to convey the waste paper suspension in a favorable manner, so far as possible, in a diluted condition.

The use of high-consistency stock towers is already known, wherein from the lowest part of the tower a fibrous suspension is drawn off in a diluted condition. A propeller has been used in effecting the rotation of the fibrous suspension in the tower. However, previously, there have become known applications just for the storage of chemical pulp or for the preparation of waste paper which has already undergone preliminary cleaning to a large extent. As mentioned, in the case of the prior art apparatus discussed hereinbefore, there is a problem in immediately removing the dirt particles to a sufficient extent. However, with the apparatus in accordance with the present invention, or with the method in accordance with the present invention respectively, all these problems are solved relatively easily, and with the respective apparatus requiring relatively few components or devices.

In one form thereof, the present invention relates to a method for the preparation of waste paper by means of impregnation and subsequent decomposition of the waste paper in a storage tank under the effect of chemicals with a high stock concentration. The steps are rotating the waste paper pulp in the storage tank, diluting the waste paper pulp in the storage tank with a fluid, and vigorously and extensively breaking up the waste paper pulp by a slushing rotor in the lowest part of the storage tank.

In one form thereof, the present invention relates to an apparatus for the preparation of waste paper by means of impregnation and subsequent decomposition of the waste paper in a storage tank under the effect of chemicals with a high stock concentration. The apparatus is characterized in that the lowest part of the storage tank is constructed as a pulper.

BRIEF DESCRIPTION OF THE DRAWINGS

The above-mentioned and other features and objects of this invention and the manner of attaining them will become more apparent and the invention itself will be better understood by reference to the following description of embodiments of the invention taken in conjunction with the accompanying drawings wherein:

FIG. 1 is a diagrammatic sectional view through the complete apparatus of the first embodiment; and FIG. 2 is an enlarged, fragmentary, diagrammatic sectional view of the second embodiment.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF A PREFERRED EMBODIMENT

In FIG. 1, an impregnating drum generally designated by 1, is supplied with waste paper in loose bulk at the front side by means of a conveyor belt designated by 2. Spray pipes 3 are provided through which fluid, in particular a chemical solution, is supplied to the waste paper by means of spray nozzles. The waste paper is impregnated with the fluid by the rotation of drum 1. In this embodiment, impregnating drum 1 is pivoted on rollers 26 and is disposed at a slight incline, so that, by its rotation, the waste paper is supplied to storage tank 4, which, as shown, is generally constructed as a tower. The inclination of impregnating drum 1 is preferably adjustable, so that the mass flow of the impregnated waste paper to the tower can be controlled. The dosage of chemicals is also regulated by the inclination and consequently by the mass flow. The waste paper remains in storage tank 4 for some time, e.g. approximately 2 to 3 hours at a waste paper pulp consistency of between 15% and 30%, so that the chemicals can have an intensive effect on the waste paper and thus dissolve it. Moreover, the waste paper reaches the storage tank with substantially all the particles of dirt it was supplied with. However, the prior removal of the cord and twine which originally held together the waste paper bales is recommended. On the other hand, it would be possible to disperse these spinning impurities by the rotor in the subsequent pulper part.

The lower part of storage tank 4 is indented somewhat conically, and, in practice, forms a pulper part, in which the fibrous suspension is brought to a low consistency of, e.g. between 4% and 7% by means of diluting water received therein via line 11. In the lowest part 5 of storage tank 4 designated as the pulper part, there now results vigorous rotation of the waste paper by a rotor 6, which also simultaneously breaks up the waste paper. Thus, there results a suspension which predominantly consists of individual fibers or smaller bundles of fibers.

It is possible or advisable to use rotor 6 disposed on the floor of storage tank 4 having a vertical shaft and to construct it accordingly to a rotor common in a pulper.

However, it is also possible to use a high-speed circulating propeller 10, as shown by dot-dash lines, which per se is normal for such towers.

At the edge of pulper part 5, a fraction of the diluted fibrous suspension is removed via line 13 through vortex apparatus 8. Vortex apparatus 8 has a rotationally symmetric housing and a rather large intake chamber 14, to which the suspension is centrally supplied through line 13. In fact, exactly opposite rotor 15, drive shaft 16 aligns with line 13. In the area of rotor 15, there is outlet pipe 17, from which the fibrous solution having the large dirt content is supplied to a screening drum 9 via line 28. Line 28 can be periodically closed by means of gate valve 27. Drum 9 has a perforated shell with holes which are suitable for sorting out the particles of dirt and is approximately 10 mm to 20 mm in diameter. Screening drum 9 is rotatably mounted on support 19. On its interior drum 9 has conveyor ribs 20 in a helical arrangement for the ejection of the dirt content which cannot be screened, i.e., to be rejected, at the inlet aperture. The "accept" reaches intermediate chest 21 through the perforations.

Instead of vortex apparatus 8, a so-called vortex pump of known design could also be used. Underneath rotor 6 of tower 4 there is shown wire plate 12, wherethrough relatively clean accept reaches discharge chamber 18 of the lower tank part and is consequently pumped away via line 22 for further processing. On the other hand, line 13 is provided for the fraction which has a high content of impurities. Line 13 is connected above discharge chamber 18 laterally next to the rotor 6 at the circulating chamber of storage tank 4.

In FIG. 2, there is shown a variant embodiment in which, laterally next to tower part 4', pulper part 5' is provided, which here also forms the lowest part of the tower or storage tank 4'. By this design, it is possible to reduce the total height of the entire installation. Here components similar to those in FIG. 1 are provided with the same reference number, but with the addition of an apostrophe.

In order to reduce the total height even further, drum 1 can also be disposed next to the tower and the impregnated waste paper can be conveyed by means of a further conveyor belt to the tower inlet aperture.

Wire 12 or 12', respectively in the tower, could also be omitted and a corresponding wire could be provided in the vortex apparatus 8', as shown by dot-dash lines in FIG. 2. Then, accept would be removed via pipe 25. Pipes 23 or 23', respectively, are only for emptying, e.g., for cleaning purposes, e.g., so as to rinse the apparatus out with water.

While the invention has been described as having specific embodiments, it will be understood that it is capable of further modifications. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. A method for the preparation of waste paper, said method comprising the steps of:
    (1) providing impregnating means for impregnating said waste paper with chemicals suitable for decomposition of said waste paper into a waste paper pulp;
    (2) introducing said waste paper to said impregnating means;
    (3) impregnating said waste paper with chemicals in said impregnating means;
    (4) providing a storage tank having an upper part, a lowest part including a pulping region, slushing rotor means for rotating and, simultaneously, vigorously and extensively breaking up the waste paper pulp in the pulping region of the lowest part, said slushing rotor means including a single slushing rotor having a vertical shaft for both rotating and breaking up said waste paper pulp, means for introducing diluting fluid to the lowest part of said storage tank, and means in said pulping region for separating diluted waste paper pulp into a clean accept fraction and a fraction which is unstrained and enriched with dirt;
    (5) communicating the waste paper pulp having a consistency of between 15% and 30% from said impregnating means to the upper part of said storage tank;
    (6) retaining said waste paper pulp in said storage tank for a period of approximately 2 to 3 hours;
    (7) diluting said waste paper pulp in the lowest part of said storage tank with a fluid;
    (8) rotating and, simultaneously, vigorously and extensively breaking up said waste paper pulp over the entire cross-section of the pulping region of the lowest part of said storage tank with said slushing rotor means;
    (9) separating said diluted waste paper pulp in said pulping region into a clean accept fraction and a fraction which is unstrained and enriched with dirt;
    (10) providing means for removing from the pulping region a fraction of said diluted paper pulp which is unstrained and enriched with dirt;
    (11) removing an unstrained and dirt-enriched fraction of said diluted paper pulp from the pulping region;
    (12) providing means for screening of diluted waste paper pulp; and
    (13) screening said removed pulp fraction in said screening means to recover the pulp fiber content.

2. The method for the preparation of waste paper as claimed in claim 1 wherein said impregnating means includes a rotatable drum with a drum axis inclined at less than about 40° from horizontal, said impregnating being provided by rotating said waste paper in said drum.

3. The method according to claim 1 further comprising the step of rotating the waste paper pulp in the lowest part of the tank at a diluted consistency of between 4% and 7%.

4. The method for the preparation of waste paper as claimed in claim 1 further comprising sorting said waste paper for the removal of cord and twine prior to impregnating with chemicals.

* * * * *